US012682273B2

(12) United States Patent
Anwar et al.

(10) Patent No.: US 12,682,273 B2
(45) Date of Patent: Jul. 14, 2026

(54) TOKENIZED FEDERATED LEARNING

(71) Applicant: International Business Machines Corporation, Armonk, NY (US)

(72) Inventors: Ali Anwar, San Jose, CA (US); Syed Amer Zawad, Reno, NV (US); Yi Zhou, San Jose, CA (US); Nathalie Baracaldo Angel, San Jose, CA (US); Kamala Micaela Noelle Varma, Minneapolis, MN (US); Annie Abay, San Jose, CA (US); Ebube Chuba, San Jose, CA (US); Yuya Jeremy Ong, San Jose, CA (US); Heiko H. Ludwig, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1181 days.

(21) Appl. No.: 17/373,611

(22) Filed: Jul. 12, 2021

(65) Prior Publication Data

US 2023/0017500 A1 Jan. 19, 2023

(51) Int. Cl.
G06N 20/00 (2019.01)
(52) U.S. Cl.
CPC .................................... G06N 20/00 (2019.01)
(58) Field of Classification Search
CPC ...................................................... G06N 20/00
See application file for complete search history.

(56) References Cited

U.S. PATENT DOCUMENTS

| | | | |
|---|---|---|---|
| 6,708,163 B1 | 3/2004 | Kargupta | |
| 10,536,437 B2 | 1/2020 | Bellala | |
| 11,449,805 B2* | 9/2022 | Zheng | G06N 20/00 |
| 2020/0026548 A1 | 1/2020 | Huang | |
| 2020/0167196 A1* | 5/2020 | Smith | G06F 9/5061 |
| 2022/0006860 A1* | 1/2022 | Lima | H04L 43/0876 |

OTHER PUBLICATIONS

Chai et al., "TiFL: A Tier-based Federated Learning System", Jun. 23, 2020, HPDC '20: Proceedings of the 29th International Symposium on High-Performance Parallel and Distributed Computing, vol. 29 (2020), pp. 125-136 (Year: 2020).*

(Continued)

*Primary Examiner* — Omar F Fernandez Rivas
(74) *Attorney, Agent, or Firm* — Robert D. Bean

(57) ABSTRACT

One embodiment of the invention provides a method for federated learning (FL) comprising training a machine learning (ML) model collaboratively by initiating a round of FL across data parties. Each data party is allocated tokens to utilize during the training. The method further comprises maintaining, for each data party, a corresponding data usage profile indicative of an amount of data the data party consumed during the training and a corresponding participation profile indicative of an amount of data the data party provided during the training. The method further comprises selectively allocating new tokens to the data parties based on each participation profile maintained, selectively allocating additional new tokens to the data parties based on each data usage profile maintained, and reimbursing one or more tokens utilized during the training to the data parties based on one or more measurements of accuracy of the ML model.

17 Claims, 9 Drawing Sheets

400

(56)                    References Cited

OTHER PUBLICATIONS

"Decentralized Machine Learning", retrieved from https://web.archive.org/web/20200210063203/https://decentralizedml.com/DML_whitepaper_31Dec_17.pdf on Feb. 24, 2025 (Year: 2020).*

Hu et al., "A Blockchain-Based Reward Mechanism for Mobile Crowdsensing", 2020, IEEE Transactions on Computational Social Systems, vol. 7 No. 1, pp. 178-191 (Year: 2020).*

Ko et al., "Machine learning for dynamic resource allocation at network edge", 2018, Proceedings vol. 10635, Ground/Air Multisensor Interoperability, Integration, and Networking for Persistent ISR IX, vol. 10635, pp. 1-10 (Year: 2018).*

Martinez et al., "Record and Reward Federated Learning Contributions with Blockchain", 2019, 2019 International Conference on Cyber-Enabled Distributed Computing and Knowledge Discovery (CyberC), vol. 2019, pp. 50-57 (Year: 2019).*

Deng et al., "FAIR: Quality-Aware Federated Learning with Precise User Incentive and Model Aggregation", May 13, 2021, IEEE INFOCOM 2021—IEEE Conference on Computer Communications, vol. 2021, pp. 1-20 (Year: 2021).*

Toyoda et al., "Blockchain-Enabled Federated Learning With Mechanism Design", 2020, IEEE Access, vol. 8, pp. 219744-219756 (Year: 2020).*

Weng et al., "DeepChain: Auditable and Privacy-Preserving Deep Learning with Blockchain-Based Incentive", 2019, IEEE Transactions on Dependable and Secure Computing, vol. 18 No 5, pp. 2438-2455 (Year: 2019).*

Short et al., "Using Blockchain Technologies to Improve Security in Federated Learning Systems", 2020, 2020 IEEE 44th Annual Computers, Software, and Applications Conference (COMPSAC), vol. 44 (2020), pp. 1183-1188 (Year: 2020).*

Ding et al., "Optimal Incentive and Load Design for Distributed Coded Machine Learning", May 17, 2021, IEEE Journal on Selected Areas in Communications, vol. 39 No. 7, pp. 2090-2104 (Year: 2021).*

Shen et al., "Blockchain-Based Incentives for Secure and Collaborative Data Sharing in Multiple Clouds", 2020, IEEE Journal on Selected Areas in Communications, vol. 38 No. 6, pp. 1229-1241 (Year: 2020).*

Nikolaidis et al., "Incentivizing Participation to Distributed Neural Network Training", Jul. 1, 2021, Proceedings of the International Neural Networks Society, vol. 3, pp. 364-374 (Year: 2021).*

Teerapittayanon et al., "DaiMoN: A Decentralized Artificial Intelligence Model Network", 2019, 2019 IEEE International Conference on Blockchain (Blockchain), vol. 2019, pp. 132-139 (Year: 2019).*

Sim et al., "Collaborative Machine Learning with Incentive-Aware Model Rewards", 2020, Proceedings of the 37th International Conference on Machine Learning, vol. 37, pp. 8927-8936 (Year: 2020).*

Kang, J., et al. "Incentive mechanism for reliable federated learning: A joint optimization approach to combining reputation and contract theory." IEEE Internet of Things Journal, Dec. 2019, pp. 10700-10714, vol. 6, No. 6, IEEE, United States.

Khan, L.U., et al. "Federated learning for edge networks: Resource optimization and incentive mechanism." IEEE Communications Magazine 58.10, Oct. 2020, pp. 88-93, IEEE, United States.

Ma, C. et al. "Distributed optimization with arbitrary local solvers." Optimization Methods and Software 32.4. 2017, pp. 813-848, v. 32, No. 4, Taylor & Francis Group, United Kingdom.

Pandey, S.R., et al. "Incentivize to build: A crowdsourcing framework for federated learning." 2019 IEEE Global Communications Conference (GLOBECOM), 2019, 6 pages, IEEE, United States.

Zhan, Y. et al. "A learning-based incentive mechanism for federated learning." IEEE Internet of Things Journal 7.7, Jul. 2020, pp. 6360-6368, IEEE, United States.

Mell et al., "The NIST Definition of Cloud Computing." National Institute of Standards and Technology Special Publication 800-145, Sep. 2011, 7 pages, United States.

Feng, S. et al., "Joint Service Pricing and Cooperative Relay Communication for Federated Learning," 2019 International Conference on Internet of Things (iThings) and IEEE Green Computing and Communications (GreenCom) and IEEE Cyber, Physical and Social Computing (CPSCom) and IEEE Smart Data (SmartData), IEEE, Jul. 14, 2019, pp. 815-820, United States.

Xu, H. et al., "Dynamic cloud pricing for revenue maximization," IEEE Transactions on Cloud Computing, Nov. 20, 2013, pp. 158-171, vol. 1, issue 2, IEEE, United States (Abstract Only}.

Wang, W. et al., "Towards Optimal Capacity Segmentation with Hybrid Cloud Pricing," 2012 IEEE 32nd International Conference on Distributed Computing Systems, Jun. 18, 2012, pp. 425-434, IEEE, United States.

Gohad, A. et al., "Cloud Pricing Models: A Survey and Position Paper," In 2013 IEEE International Conference on Cloud Computing in Emerging Markets (CCEM), Oct. 16, 2013, pp. 1-8, IEEE, United States.

* cited by examiner

400

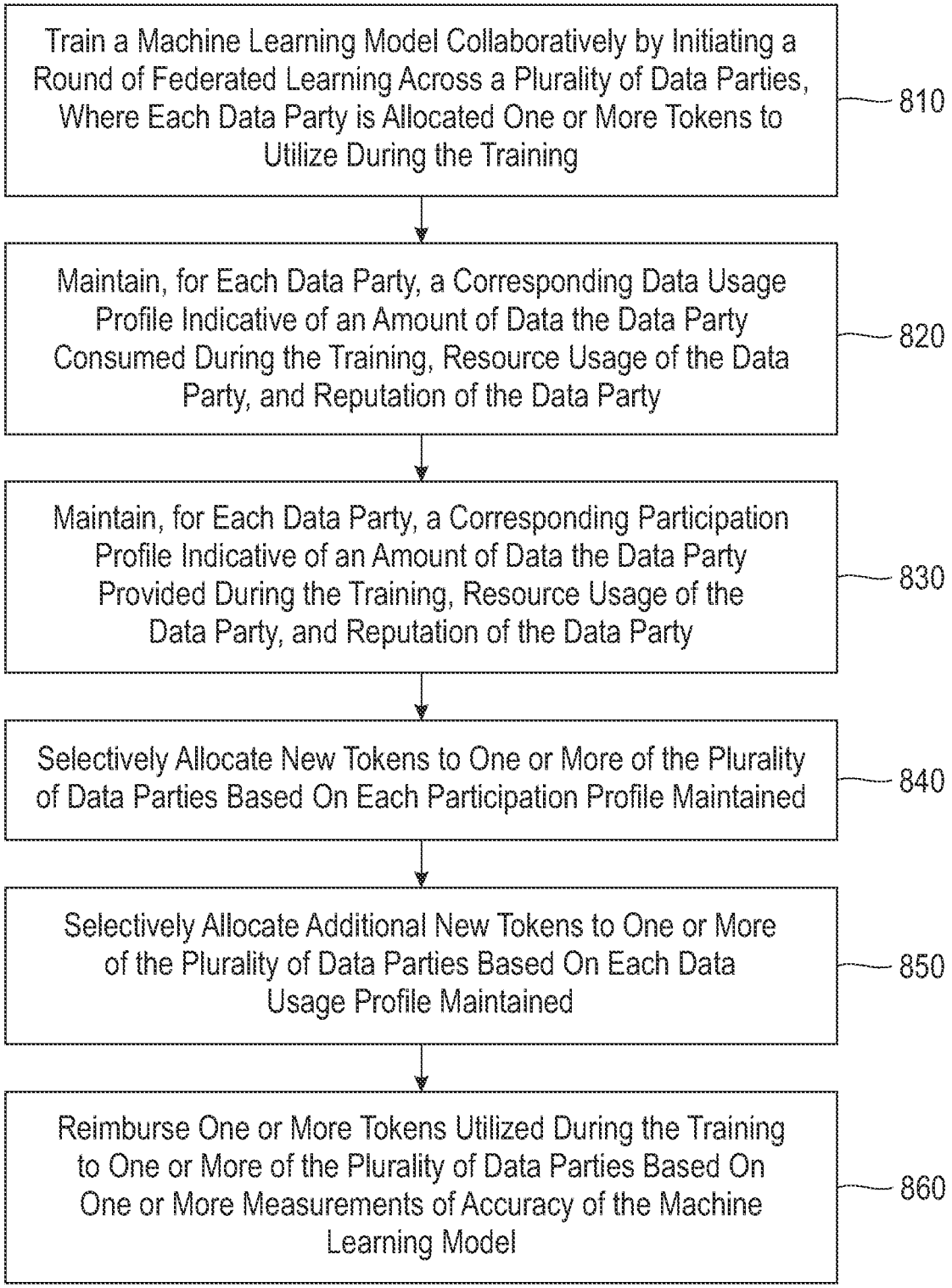

800

Train a Machine Learning Model Collaboratively by Initiating a Round of Federated Learning Across a Plurality of Data Parties, Where Each Data Party is Allocated One or More Tokens to Utilize During the Training — 810

Maintain, for Each Data Party, a Corresponding Data Usage Profile Indicative of an Amount of Data the Data Party Consumed During the Training, Resource Usage of the Data Party, and Reputation of the Data Party — 820

Maintain, for Each Data Party, a Corresponding Participation Profile Indicative of an Amount of Data the Data Party Provided During the Training, Resource Usage of the Data Party, and Reputation of the Data Party — 830

Selectively Allocate New Tokens to One or More of the Plurality of Data Parties Based On Each Participation Profile Maintained — 840

Selectively Allocate Additional New Tokens to One or More of the Plurality of Data Parties Based On Each Data Usage Profile Maintained — 850

Reimburse One or More Tokens Utilized During the Training to One or More of the Plurality of Data Parties Based On One or More Measurements of Accuracy of the Machine Learning Model — 860

TOKENIZED FEDERATED LEARNING

BACKGROUND

The field of embodiments of the invention generally relate to federated learning in distributed data environments.

Federated learning involves a collaboration between a plurality of parties to learn/train a predictive machine learning model based on training data comprising a plurality of disparate data sources owned by the parties (i.e., data parties), without sharing/revealing the training data. As federated learning involves collaborative training of a machine learning model without sharing/revealing training data, federated learning is secure, private, and can conform to government regulations. The model resulting from the collaboration is more accurate than any model learned in isolation based on one data source only. Trust between the parties may vary depending on relationships between the parties. Therefore, there may be limited trust between the parties. The parties may include, but are not limited to, individuals providing personal data via mobile applications operating on their mobile devices (e.g., smartphones, Internet of things (IoT) devices, etc.), different institutions under the same umbrella company, competing companies within the same domain/field (e.g., cable companies, banks), etc. The data sources may include, but are not limited to, enterprise data, user data, etc.

For accuracy and performance of a machine learning model resulting from collaborative training, conventional platforms for federated learning implement approaches such as data heterogeneity (i.e., data quantity, data quality, data collecting speed, and non-iid (independent and identically distributed) samples), party connectivity (i.e., always online versus online for a few hours, network quality and computation resources), and party reputations (i.e., prestigious cooperation vs. private sensors, malicious party involved). None of these conventional platforms, however, provide an aggregator configured to incentivize federated learning so that parties are compensated both for their data and resources. For example, there is a need to encourage participation of good data silos, promote collaboration among parties, and encourage frequent participation.

SUMMARY

Embodiments of the invention generally relate to federated learning, and more specifically, to a method and system for incentivizing federated learning across data parties using tokens.

One embodiment of the invention provides a method for federated learning. The method comprises training a machine learning model collaboratively by initiating a round of federated learning across a plurality of data parties. Each data party is allocated one or more tokens to utilize during the training. The method further comprises maintaining, for each data party, a corresponding data usage profile indicative of an amount of data the data party consumed during the training, resource usage of the data party, and reputation of the data party. The method further comprises maintaining, for each data party, a corresponding participation profile indicative of an amount of data the data party provided during the training, resource usage of the data party, and reputation of the data party. The method further comprises selectively allocating new tokens to one or more of the data parties based on each participation profile maintained, and selectively allocating additional new tokens to one or more of the data parties based on each data usage profile maintained. The method further comprises reimbursing one or more tokens utilized during the training to one or more of the data parties based on one or more measurements of accuracy of the machine learning model. Other embodiments include a system for federated learning, and a computer program product for federated learning. These features contribute to the advantage of incentivizing federated learning so that data parties are compensated both for their data and resources.

One or more of the following features may be included. In some embodiments, for each data party, a corresponding number of tokens utilized by the data party is counted during the training, where the corresponding number of tokens is indicative of an amount of data the data party consumed to train a corresponding local model. The data parties are sorted into a ranked list based on, for each data party, a corresponding number of tokens utilized by the data party during the training. The new tokens are allocated based on the first list, where a data party ranked first in the ranked list is allocated the most amount of the new tokens, and another data party ranked last in the ranked list is allocated the fewest amount of the new tokens. These optional features contribute to the advantage of rewarding data parties that utilized higher amounts of tokens with free tokens, and incentivizing other data parties that utilized fewer amounts of tokens to consume more data. These optional features further contribute to the advantage of enabling data parties to keep training for longer times by allocating free tokens to incentivize longer training times.

In some embodiments, for each data party, a corresponding number of tokens utilized by the data party is counted during the training, where the corresponding number of tokens is indicative of an amount of data the data party provided to train a corresponding local model or another local model corresponding to another data party. The data parties are sorted into a ranked list based on, for each data party, a corresponding number of tokens utilized by the data party during the training. The additional new tokens are allocated based on the first list, where a data party ranked first in the ranked list is allocated the most amount of the additional new tokens, and another data party ranked last in the ranked list is allocated the fewest amount of the additional new tokens. These optional features contribute to the advantage of rewarding data parties that have higher amounts of tokens utilized on them with free tokens, and encourages more participation from them.

In some embodiments, for each round of federated learning, a first measurement representing a maximum accuracy of the machine learning model until the round of federated learning is tracked, a second measurement representing an accuracy of the machine learning model in the round of federated learning is tracked, and an improvement in the accuracy of the machine learning model is determined based on the first measurement and the second measurement. An amount of tokens utilized during the training to reimburse is determined based on the improvement in the accuracy of the machine learning model. These optional features contribute to the advantage of reimbursing tokens to data parties based on utility derived from the data parties over time. These optional features further contribute to the advantage of ensuring that allocation of new tokens to data parties is fair, that participation/selection of data parties that provide data from which other data parties benefit from is encouraged, and that participation of data parties in earlier epochs of federated learning is encouraged.

These and other aspects, features and advantages of embodiments of the invention will be understood with reference to the drawing figures, and detailed description herein, and will be realized by means of the various elements and combinations particularly pointed out in the appended claims. It is to be understood that both the foregoing general description and the following brief description of the drawings and detailed description of embodiments of the invention are exemplary and explanatory of preferred embodiments of the invention, and are not restrictive of embodiments of the invention, as claimed.

BRIEF DESCRIPTION OF THE DRAWINGS

The subject matter which is regarded as embodiments of the invention are particularly pointed out and distinctly claimed in the claims at the conclusion of the specification. The foregoing and other objects, features, and advantages of embodiments of the invention are apparent from the following detailed description taken in conjunction with the accompanying drawings in which:

FIG. 6 is a flowchart for an example process for incentivizing federated learning across data parties using tokens, in accordance with an embodiment of the invention;

The detailed description explains the preferred embodiments of the invention, together with advantages and features, by way of example with reference to the drawings.

DETAILED DESCRIPTION

Embodiments of the invention generally relate to federated learning, and more specifically, to a method and system for incentivizing federated learning across data parties using tokens.

One embodiment of the invention provides a method for federated learning. The method comprises training a machine learning model collaboratively by initiating a round of federated learning across a plurality of data parties. Each data party is allocated one or more tokens to utilize during the training. The method further comprises maintaining, for each data party, a corresponding data usage profile indicative of an amount of data the data party consumed during the training. The method further comprises maintaining, for each data party, a corresponding participation profile indicative of an amount of data the data party provided during the training. The method further comprises selectively allocating new tokens to one or more of the plurality of data parties based on each participation profile maintained, and selectively allocating additional new tokens to one or more of the plurality of data parties based on each data usage profile maintained. The method further comprises reimbursing one or more tokens utilized during the training to one or more of the plurality of data parties based on one or more measurements of accuracy of the machine learning model. Other embodiments include a system for federated learning, and a computer program product for federated learning.

Figure 1:
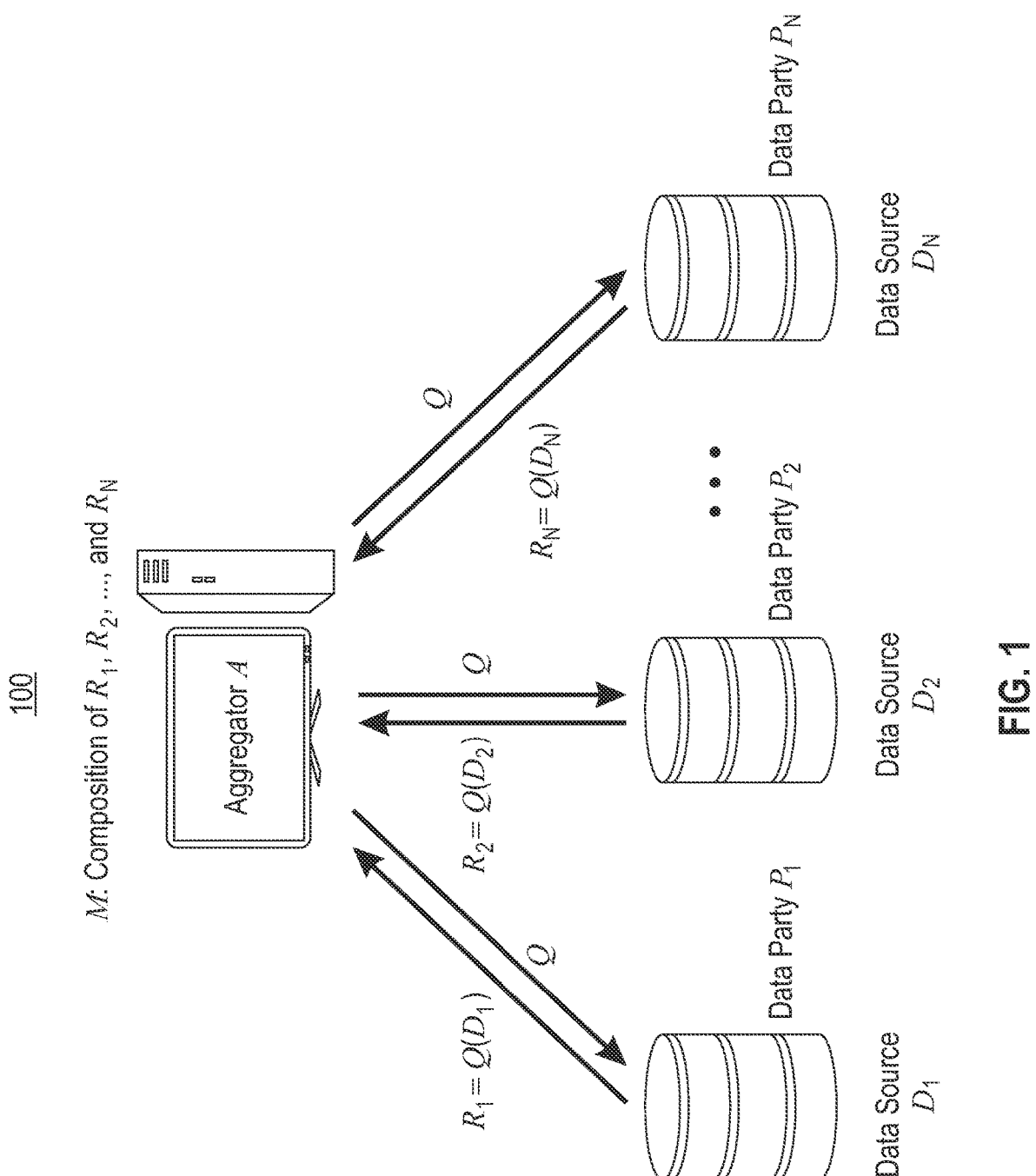
FIG. 1 illustrates an example system that implements a conventional approach to federated learning.

FIG. 1 illustrates an example system 100 that implements a conventional approach to federated learning. The system 100 is a complex computing architecture comprising an aggregator A and a plurality of data sources $D_1, D_2, \ldots,$ and $D_N$ owned by a plurality of data parties $P_1, P_2, \ldots,$ and $P_N$, respectively. For example, the data sources $D_1, D_2, \ldots,$ and $D_N$ are local databases. The aggregator A is configured to monitor federated learning by: (1) issuing a learning request Q to each of the data parties $P_1, P_2, \ldots,$ and $P_N$, (2) collecting data from the data parties $P_1, P_2, \ldots,$ and $P_N$, (3) aggregating the data collected, and (4) training and/or updating a machine learning model based on a resulting aggregation of the data collected.

In a given epoch (i.e., round of federated learning or learning/training run), the aggregator A is configured to send a learning request Q to a data party $P_i$, and receive, from the data party $P_i$, a response $R_i$ based on a data source $D_i$ owned by the data party $P_i$, wherein $i \in [1, \ldots, N]$. For example, as shown in FIG. 1, in response to a learning request Q sent to each data party $P_i$ in a given epoch, the aggregator A receives a response $R_1$ from the data source $D_1$, a response $R_2$ from the data source $D_2, \ldots,$ and a response $R_N$ from the data source $D_N$, wherein $R_1 = Q$ $(D_1)$, $R_2 = Q$ $(D_2)$, $\ldots,$ and $R_N = Q(D_N)$. The aggregator A trains and/or updates a machine learning model M based on an aggregation/composition of the replies $R_1, R_2, \ldots,$ and $R_N$ (e.g., a simple average, i.e., $M = f$ $((R_1 + R_2 + \ldots + R_N)/N)$. The machine learning model M is a global predictive model.

The learning request Q comprises one or more of the following: a query for gradients given a current model parameter (e.g., current weight) of the machine learning model M, a query for one or more new model parameters of the machine learning model M given a current model parameter (e.g., current weight) of the machine learning model M, or a query for information about a specific class/classification/label (e.g., counts for a specific label).

Conventional platforms for federated learning focus on accuracy and performance of the machine learning model M. Such conventional platforms implement approaches such as data heterogeneity (i.e., data quantity, data quality, data collecting speed, and non-iid (independent and identically distributed) samples), party connectivity (i.e., always online versus online for a few hours, network quality and computation resources), and party reputations (i.e., prestigious cooperation vs. private sensors, malicious party involved). None of these conventional platforms provide an aggregator configured to incentivize federated learning so that parties are compensated both for their data and resources.

Figure 2:
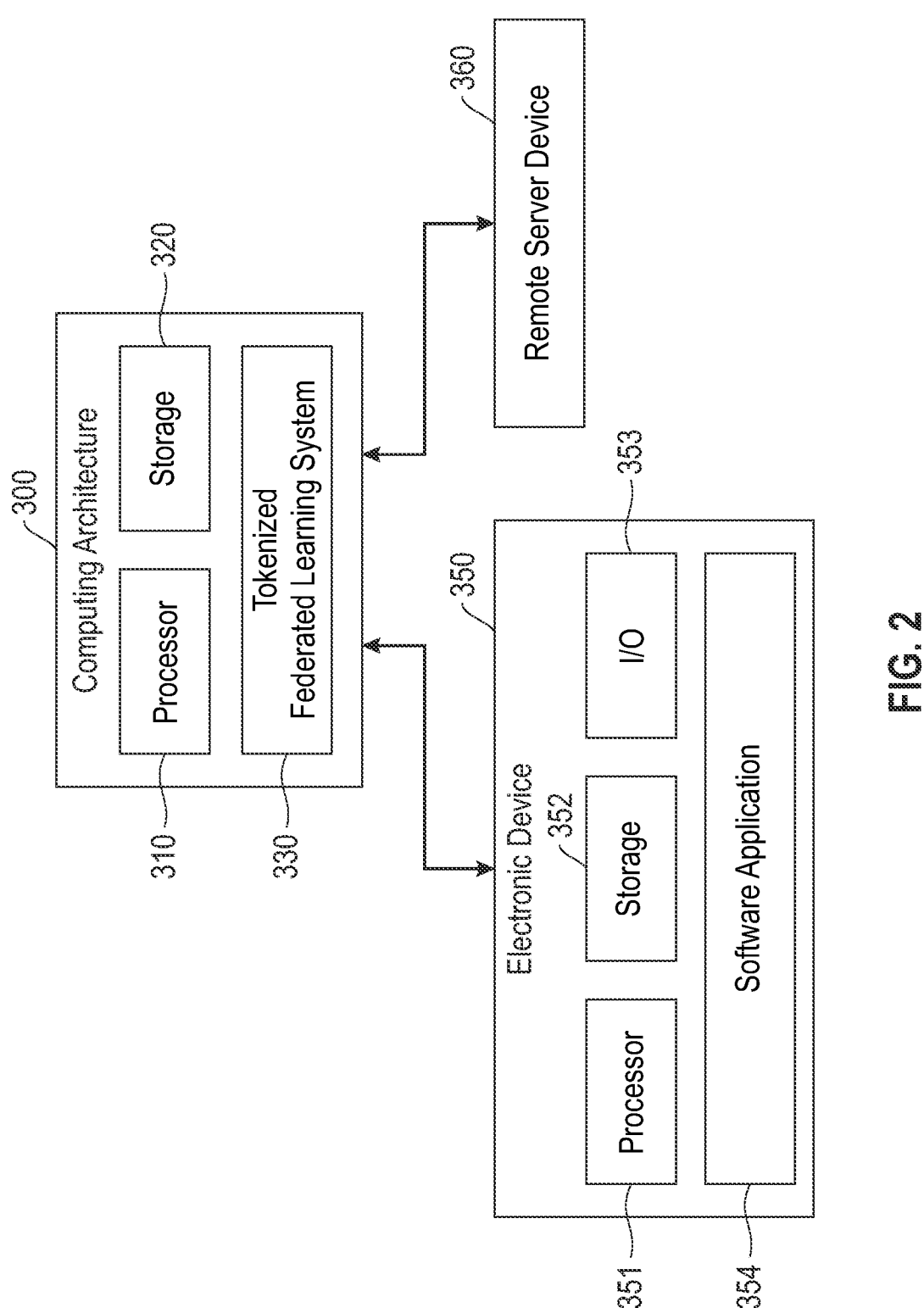
FIG. 2 illustrates an example computing architecture for implementing tokenized federated learning, in accordance with an embodiment of the invention.

FIG. 2 illustrates an example computing architecture 300 for implementing tokenized federated learning, in accordance with an embodiment of the invention. In one embodiment, the computing architecture 300 is a centralized computing architecture. In another embodiment, the computing architecture 300 is a distributed computing architecture.

In one embodiment, the computing architecture 300 comprises computation resources such as, but not limited to, one or more processor units 310 and one or more storage units 320. One or more applications may execute/operate on the computing architecture 300 utilizing the computation resources of the computing architecture 300. In one embodiment, the applications on the computing architecture 300 include, but are not limited to, a tokenized federated learning system 330 configured to incentivize federated learning across data parties using tokens. As described in detail later herein, the tokenized federated learning system 330 provides federated learning that implements a token-based pricing model, encourages participation of good data silos, promotes collaboration among parties, and encourages frequent participation.

In one embodiment, the tokenized federated learning system 330 is configured to exchange data with one or more electronic devices 350 and/or one or more remote server devices 360 over a connection (e.g., a wireless connection such as a Wi-Fi connection or a cellular data connection, a wired connection, or a combination of the two).

In one embodiment, an electronic device 350 comprises one or more computation resources such as, but not limited to, one or more processor units 351 and one or more storage units 352. One or more applications may execute/operate on an electronic device 350 utilizing the one or more computation resources of the electronic device 350 such as, but not limited to, one or more software applications 354 loaded onto or downloaded to the electronic device 350. Examples of software applications 354 include, but are not limited to, artificial intelligence (AI) applications, etc.

Examples of an electronic device 350 include, but are not limited to, a desktop computer, a mobile electronic device (e.g., a tablet, a smart phone, a laptop, etc.), a wearable device (e.g., a smart watch, etc.), an Internet of things (IoT) device, a smart appliance such as a smart television, etc.

In one embodiment, an electronic device 350 comprises one or more input/output (I/O) units 353 integrated in or coupled to the electronic device 350, such as a keyboard, a keypad, a touch interface, a display screen, etc. A user may utilize an I/O module 353 of an electronic device 350 to configure one or more user preferences, configure one or more parameters, provide input, etc.

In one embodiment, an electronic device 350 and/or a remote server device 360 may be a source of historical data and/or a document.

In one embodiment, the tokenized federated learning system 330 may be accessed or utilized by one or more online services (e.g., AI services) hosted on a remote server device 360 and/or one or more software applications 354 (e.g., AI applications) operating on an electronic device 350. For example, in one embodiment, a virtual assistant, a search engine, or another type of software application 354 operating on an electronic device 350 can invoke the system 330 to perform a task.

Figure 3:
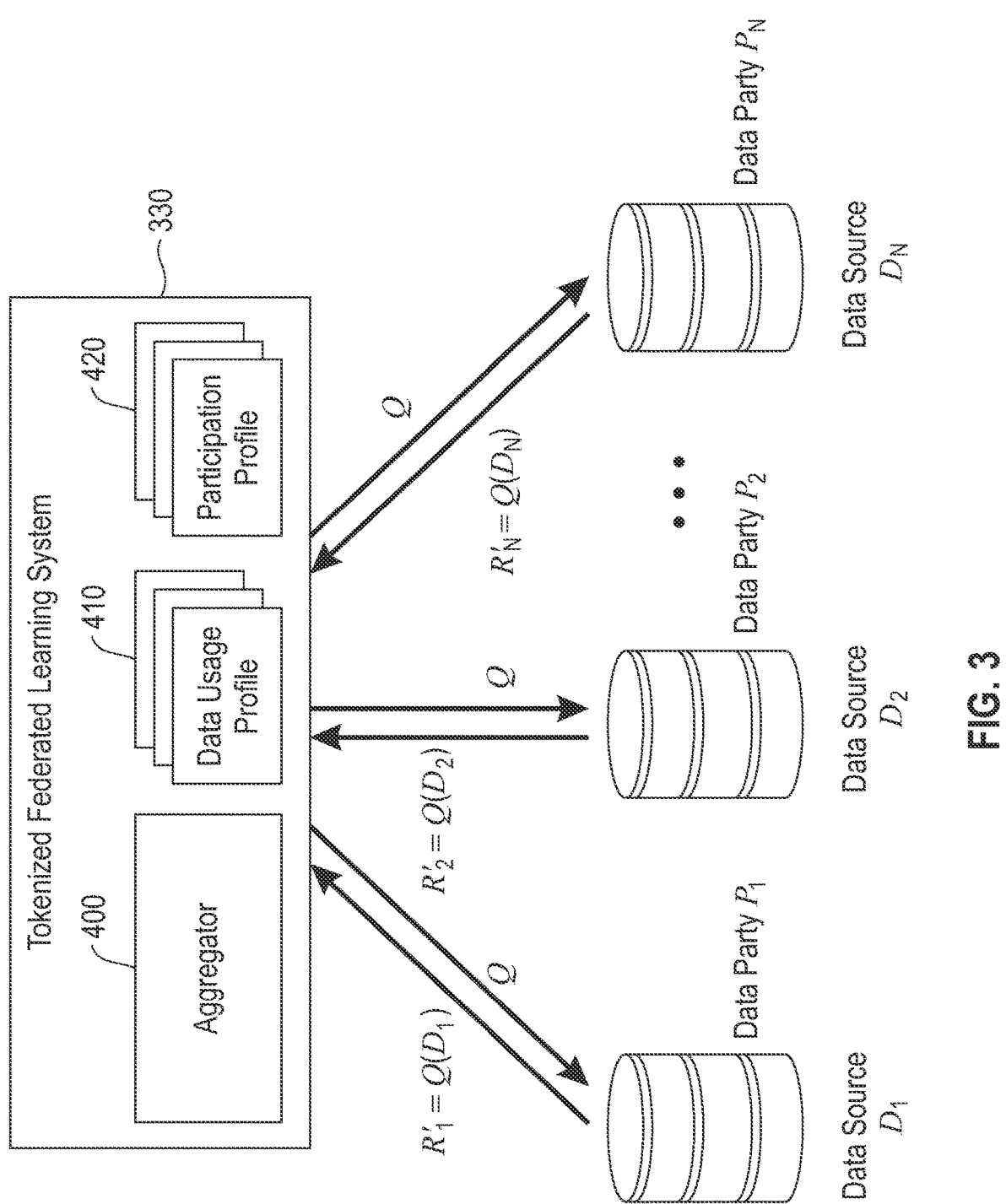
FIG. 3 illustrates an example tokenized federated learning system, in accordance with an embodiment of the invention.

FIG. 3 illustrates an example tokenized federated learning system 330, in accordance with an embodiment of the invention. In one embodiment, the tokenized federated learning system 330 comprises an aggregator 400, one or more data usage profiles 410, and one or more participation profiles 420. The aggregator 400 is configured to control one or more rounds of federated learning (i.e., one or more epochs or learning/training runs) across a plurality of data parties $P_i$ (e.g., $P_1$, $P_2$, . . . , and $P_N$) in a tokenized fashion by selectively reimbursing and/or allocating, during each round of federated learning, one or more tokens to one or more of the data parties $P_i$ based data usage and participation of each of the data parties $P_i$.

In one embodiment, for each data party $P_i$, the system 330 maintains: (1) a corresponding data usage profile 410 comprising information relating to data usage/consumption of the data party $P_i$, resource usage of the data party $P_i$, and reputation of the data party $P_i$, and (2) a corresponding participation profile 420 comprising information relating to participation of the data party $P_i$, resource usage of the data party $P_i$, and reputation of the data party $P_i$. A data usage profile 410 corresponding to a data party $P_i$ is indicative of a degree to which the data party $P_i$ is a consumer of data. A participation profile 420 corresponding to a data party $P_i$ is indicative of a degree to which the data party $P_i$ is a provider of data. Each data usage profile 410, participation profile 420 corresponding to a data party $P_i$ is further indicative of resource usage and reputation of the data party $P_i$. During each epoch (i.e., round) of federated learning, a data party is a consumer that consumes data using tokens, and/or a provider that provides data without using tokens. Providers are seeking to benefit from data they provide without compromising privacy, such as selling insights of their data and learning from their own data.

In one embodiment, in a given epoch (i.e., round) of federated learning, the aggregator 400 is configured to issue, to one or more of the data parties $P_i$, a learning request Q. For example, in one embodiment, the aggregator 400 is configured to issue a learning request Q to each of the data parties $P_i$ in a given epoch of federated learning. As another example, in one embodiment, the aggregator 400 is configured to select one or more of the data parties $P_i$ (e.g., in accordance with an algorithm for dynamic selection), and issue a learning request Q to the one or more data parties $P_i$ selected in a given epoch of federated learning.

Let $R'_i$ generally denote a model ("local model") locally trained by a data party $P_i$. The system 330 supports training a plurality of local models $R'_i$ in parallel in a given epoch (i.e., round) of training.

In one embodiment, in a given epoch (i.e., round) of federated learning, in response to receiving a learning request Q from the aggregator 400 in the given epoch, a data party $P_i$ is configured to: (1) train a local model $R'_i$ based on a data source $D_i$ owned by the data party $P_i$, and (2) send the local model $R'_i$ resulting from the training to the aggregator 400.

In one embodiment, in a given epoch (i.e., round) of federated learning, the aggregator 400 is configured to profile data usage of each data party $P_i$ by determining/identifying how much data the data party $P_i$ consumed in the given epoch to train a local model $R'_i$. For example, in one embodiment, the data consumed by the data party $P_i$ is from a data source $D_i$ owned by the data party $P_i$ and/or a different data source $D_k$ owned by a different data party $P_k$, wherein $i \in [1, \ldots, N]$, and $i \neq k$. In one embodiment, in a given epoch of federated learning, the aggregator 400 is configured to update each data usage profile 410 corresponding to each data party $P_i$ based on data usage of the data party $P_i$ in the given epoch.

In one embodiment, in a given epoch (i.e., round) of federated learning, the aggregator 400 is configured to profile participation of each data party $P_i$ by determining/identifying how much data from a data source $D_i$ owned by the data party $P_i$ is used in the given epoch. For example, in one embodiment, data from the data source $D_i$ is used by the data party $P_i$ to train a local model $R'_i$ and/or a different data party $P_k$ to train a different local model $R'_k$. In one embodiment, in a given epoch of federated learning, the aggregator 400 is configured to update each participation profile 420 corresponding to each data party $P_i$ based on participation of the data party $P_i$ in the given epoch.

Figure 4:
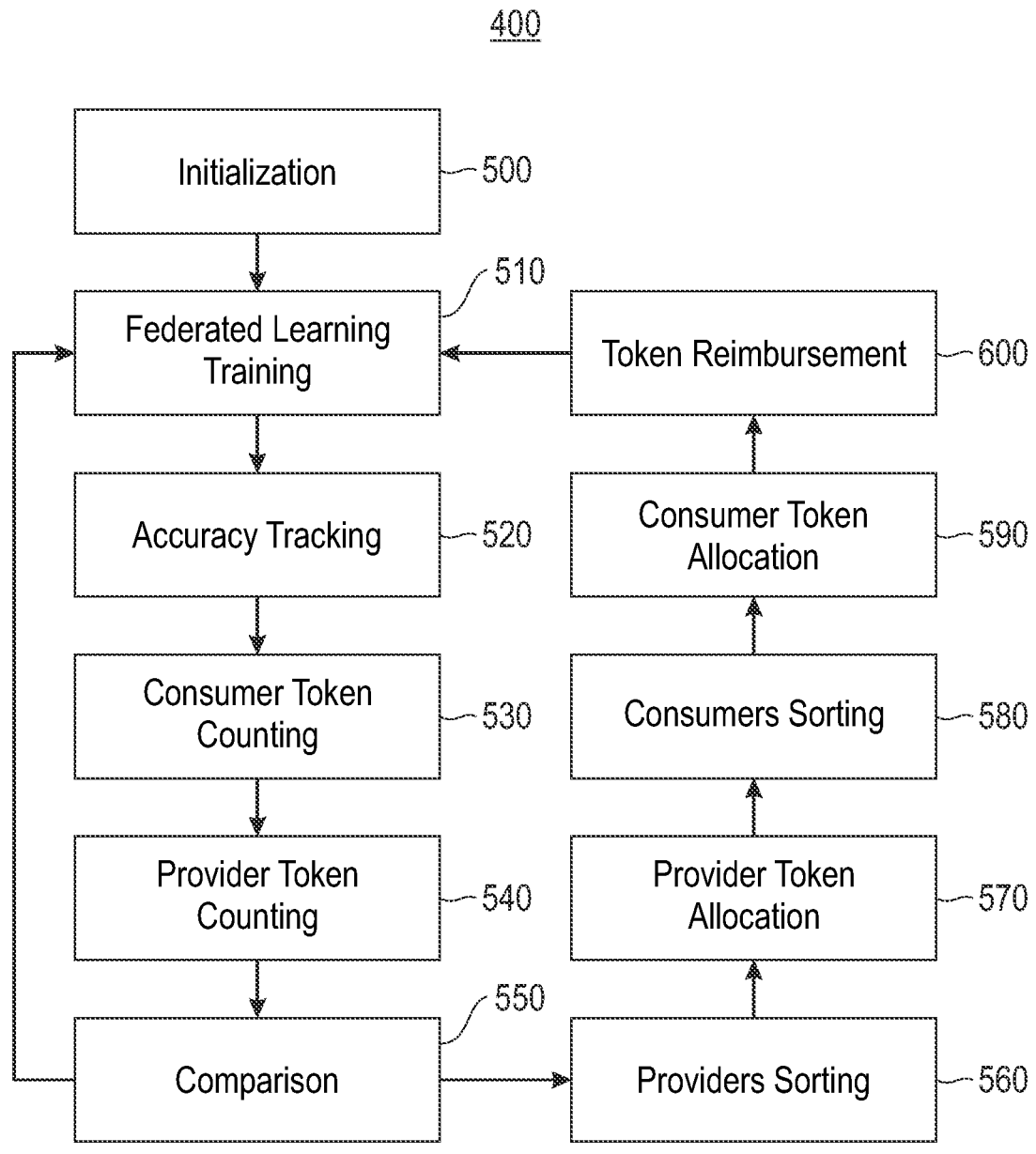
FIG. 4 illustrates an example aggregator, in accordance with an embodiment of the invention.

FIG. 4 illustrates an example aggregator 400, in accordance with an embodiment of the invention. In one embodiment, the aggregator 400 comprises an initialization unit 500 configured to setup the data parties $P_i$, initial tokens, and models. In one embodiment, the initialization unit 500 distributes tokens to each of the data parties $P_i$. In one embodiment, the initialization unit 500 sells tokens to one or more data parties $P_i$.

In one embodiment, the aggregator 400 comprises a federated learning training unit 510 configured to train, via federated learning, a machine learning model M using tokens. In a given epoch (i.e., round) of federated learning, the federated learning training unit 510 is configured to: (1) issue, to one or more of the data parties $P_i$, a learning request Q, (2) receive one or more local models $R'_i$ from the one or more data parties $P_i$ in response to the one or more data parties $P_i$ receiving the learning request Q, and (3) train and/or update a machine learning model M based on an aggregation of the one or more local models $R'_i$.

In one embodiment, the aggregator 400 comprises an accuracy tracking unit 520 configured to track, in each given epoch (i.e., round) of federated learning, accuracy of the machine learning model M in the given epoch relative to one or more previous epochs of federated learning, if any.

In one embodiment, the aggregator 400 comprises a consumer token counting unit 530 configured to profile, in a given epoch (i.e., round) of federated learning, data usage of each data party $P_i$ in the given epoch by counting a number of tokens used by the data party $P_i$ in the given epoch. In one embodiment, a number of tokens used by a data party $P_i$ in a given epoch is indicative of how much data the data party $P_i$ consumed in the given epoch to train a local model $R_i$, where the data consumed is from a data source $D_i$ owned by the data party $P_i$ and/or a different data source $D_k$ owned by a different data party $P_k$. In one embodiment, the consumer token counting unit 530 is configured to update, in a given epoch of federated learning, a data usage profile 410 corresponding to each data party $P_i$ based on a number of tokens used by the data party $P_i$ in the given epoch.

In one embodiment, the aggregator 400 comprises a provider token counting unit 540 configured to profile, in a given epoch (i.e, round) of federated learning, participation of each data party $P_i$ in the given epoch by counting a number of tokens used on the data party $P_i$ in the given epoch. In one embodiment, a number of tokens used on a data party $P_i$ in a given epoch is indicative of how much data the data party $P_i$ provided in the given epoch, where the data provided is used by the data party $P_i$ to train a local model $R_i$ and/or by a different data party $P_k$ to train a different local model $R_k$. In one embodiment, the provider token counting unit 540 is configured to update, in a given epoch of federated learning, a participation profile 420 corresponding to each data party $P_i$ in the given epoch based on a number of tokens used on the data party $P_i$ in the given epoch.

In one embodiment, the aggregator 400 comprises a comparison unit 550 configured to determine whether to initiate another epoch (i.e., round) of federated learning. Let t generally denote an amount of tokens currently available (after a given round of federated learning), and let $t_{update}$ generally denote an updated number of tokens available for distribution. In one embodiment, the comparison unit 520 determines to initiate another epoch of federated learning if $t<t_{update}$; otherwise, if $t \geq t_{update}$, the comparison unit 520 delays initiating another epoch of federated learning until new tokens are allocated and some tokens used in the given epoch are reimbursed. If the comparison unit 520 determines to initiate another epoch of federated learning, the comparison unit 520 triggers/invokes the federated learning training unit 510 to initiate another epoch.

In one embodiment, the aggregator 400 comprises a providers sorting unit 560. In a given epoch (i.e., round) of federated learning, the providers sorting unit 560 is configured to: (1) sort one or more data parties $P_i$ that provided data (i.e., from one or more data sources $D_1$ owned by the one or more data parties $P_i$) in the given epoch based on participation of each of the one or more data parties $P_i$, and (2) generate a ranked/ordered list of the one or more data parties $P_i$ based on the sorting. In one embodiment, the providers sorting unit 560 sorts the one or more data parties $P_i$ that provided data in the given epoch based on a participation profile 420 corresponding to each of the one or more data parties $P_i$. Each participation profile 420 corresponding to each of the one or more data parties $P_i$ is indicative of a number of tokens used on the data party $P_i$ in the given epoch, resource usage of the data party $P_i$, and reputation of the data party $P_i$. For example, in one embodiment, a data party $P_i$ with the largest amount of tokens used on the data party $P_i$ in the given epoch is ranked first in the ranked/ordered list, whereas a different data party $P_k$ with the smallest amount of tokens used on the different data party $P_k$ in the given epoch is ranked last in the ranked/ordered list. The ranked/ordered list generated by the providers sorting unit 560 indicates data parties that are good providers of data and other data parties that are bad providers of data. Data parties that are good providers of data have higher amounts of tokens used on the data parties compared to other data parties that are bad providers of data.

In one embodiment, the aggregator 400 comprises a provider token allocation unit 570. In a given epoch (i.e., round) of federated learning, the provider token allocation unit 570 is configured to allocate one or more new tokens to one or more data parties $P_i$ that provided data in the given epoch based on a ranked/ordered list of the one or more data parties $P_i$ (e.g., generated by the providers sorting unit 560), wherein the ranked/ordered list sorts the one or more data parties $P_i$ based on participation of the one or more data parties $P_i$ in the given epoch. In one embodiment, the new tokens are free tokens. By rewarding good providers of data with free tokens, the system 330 incentivizes good providers of data to participate more, i.e., encourages more participation from good providers of data.

Table 1 below provides an example pseudocode for an algorithm implemented by the provider token allocation unit 570 for allocating new tokens to data parties that provide data, in one embodiment.

TABLE 1

```
n = a total number of data parties
D = a ranking denominator, where D = n * (n + 1)/2
S = a ranked/ordered list of the data parties sorted in descending
order of participation in a given epoch (i.e., sorted based on a
number of tokens used on each data party, in descending order),
where S = SortedDescending([All Data Parties])
s = a data party ranked top/first in the ranked/ordered list S
(i.e., the data party with the most number of tokens used on the
data party in the given epoch), where s = top_k(S, k)
F = a total number of free tokens available for allocation
r = 0
For each data party P_i in the ranked/ordered list S:
# of free tokens allocated to P_i = (n - r) * F/D
r ++
```

Table 2 below provides an example application of the algorithm provided in Table 1, in one embodiment.

TABLE 2

```
n = 5
D = 5*(5 + 1)/2 = 15
S = SortedDescending([4, 2, 3, 1, 2]) = [4, 3, 2, 2, 1], wherein
```

TABLE 2-continued

[4, 2, 3, 1, 2] denotes 4 tokens used on $P_1$, 2 tokens used on $P_2$, 3 tokens used on $P_3$, 1 token used on $P_4$, and 2 tokens used on $P_5$, and wherein [4, 3, 2, 2, 1] denotes $P_1$ is ranked first, $P_3$ is ranked second, $P_2$ is ranked third, $P_5$ is ranked fourth, and $P_4$ is ranked fifth in the ranked/ordered list S, such that S = $[s_0 = P_1, s_1 = P_3, s_2 = P_2, s_3 = P_5, s_4 = P_4]$
F = 100
r = 0
First iterative loop (i.e., when r = 0):
# of free tokens allocated to $s_0$ (i.e., $P_1$) = (5 − 0) * 100/15 ≈ 33
Second iterative loop (i.e., when r = 1):
# of free tokens allocated to $s_1$ (i.e., $P_3$) = (5 − 1) * 100/15 ≈ 27
Third iterative loop (i.e., when r = 2):
# of free tokens allocated to $s_2$ (i.e., $P_2$) = (5 − 2) * 100/15 = 20
Fourth iterative loop (i.e., when r = 3):
# of free tokens allocated to $s_3$ (i.e., $P_5$) = (5 − 3) * 100/15 ≈ 13
Fifth iterative loop (i.e., when r = 4):
# of free tokens allocated to $s_4$ (i.e., $P_4$) = (5 − 4) * 100/15 ≈ 7

As shown in Tables 1-2, in one embodiment, the provider token allocation unit 570 allocates a data party ranked first in the ranked/ordered list with more free tokens than any other data party in the ordered list. As further shown in Tables 1-2, in one embodiment, the provider token allocation unit 570 allocates a data party ranked last in the ordered list with fewer free tokens than any other data party in the ordered list.

In one embodiment, the aggregator 400 comprises a consumers sorting unit 580. In a given epoch (i.e., round) of federated learning, the consumers sorting unit 580 is configured to: (1) sort one or more data parties $P_i$ that consumed data (i.e., to train one or more local models $R_i$) in the given epoch based on data usage of each of the one or more data parties $P_i$, and (2) generate a ranked/ordered list of the one or more data parties $P_i$ based on the sorting. In one embodiment, the consumers sorting unit 580 sorts the one or more data parties $P_i$ that consumed data in the given epoch based on a data usage profile 410 corresponding to each of the one or more data parties P. Each data usage profile 410 corresponding to each of the one or more data parties $P_i$ is indicative of a number of tokens used by the data party $P_i$ in the given epoch, resource usage of the data party $P_i$, and reputation of the data party P. For example, in one embodiment, a data party $P_i$ that used the largest amount of tokens in the given epoch is ranked first in the ranked/ordered list, whereas a different data party $P_k$ that used the smallest amount of tokens in the given epoch is ranked last in the ranked/ordered list. The ranked/ordered list generated by the consumers sorting unit 580 indicates data parties that are good consumers of data and other data parties that are bad consumers of data. Data parties that are good consumers of data used higher amounts of tokens compared to other data parties that are bad consumers of data.

In one embodiment, the aggregator 400 comprises a consumer token allocation unit 590. In a given epoch (i.e., round) of federated learning, the consumer token allocation unit 590 is configured to allocate one or more new tokens to one or more data parties $P_i$ that consumed data in the given epoch based on a ranked/ordered list of the one or more data parties $P_i$ (e.g., generated by the consumers sorting unit 580), wherein the ranked/ordered list sorts the one or more data parties $P_i$ based on data usage of the one or more data parties $P_i$ in the given epoch. In one embodiment, the new tokens are free tokens. By rewarding good consumers of data with free tokens, the system 330 incentivizes bad consumers of data to consume more data. Further, the system 330 enable data parties to keep training for longer times by allocating free tokens to incentivize longer training times.

Table 3 below provides an example pseudocode for an algorithm implemented by the consumer token allocation unit 590 for allocating new tokens to data parties that consume data, in one embodiment.

TABLE 3

T = token base price
U = token marked-up price
C = a total number of tokens used in a given epoch
E = extra tokens available in a given epoch, where E = U * C/T
n = a total number of data parties
D = a ranking denominator, where D = n * (n + 1)/2
S = a ranked/ordered list of the data parties sorted in descending order of participation in a given epoch (i.e., sorted based on a number of tokens used by each data party, in descending order), where S = SortedDescending([All Data Parties])
s = a data party ranked top/first in the ranked/ordered list S (i.e., the data party that used the most number of tokens in the given epoch), where s = top_k(S, k)
F = a total number of free tokens available for allocation, where F = E
r = 0
For each data party $P_i$ in the ranked/ordered list S:
# of free tokens allocated to $P_i$ = (n − r) * F/D
r + +

Table 4 below provides an example application of the algorithm provided in Table 3, in one embodiment.

TABLE 4

T = 100
U = 5
C = 200
E = 200*5/100 = 10
n = 5
D = 5*(5 + 1)/2 = 15
S = SortedDescending([4, 2, 3, 1, 2]) = [4, 3, 2, 2, 1], wherein [4, 2, 3, 1, 2] denotes $P_1$ used 4 tokens, $P_2$ used 2 tokens, $P_3$ used 3 tokens, $P_4$ used 1 token, and $P_5$ used 2 tokens, and wherein [4, 3, 2, 2, 1] denotes $P_1$ is ranked first, $P_3$ is ranked second, $P_2$ is ranked third, $P_5$ is ranked fourth, and $P_4$ is ranked fifth in the ranked/ordered list S, such that S = $[s_0 = P_1, s_1 = P_3, s_2 = P_2, s_3 = P_5, s_4 = P_4]$
F = E = 10
r = 0
First iterative loop (i.e., when r = 0):
# of free tokens allocated to $s_0$ (i.e., $P_1$) = (5 − 0) * 10/15 ≈ 3
Second iterative loop (i.e., when r = 1):
# of free tokens allocated to $s_1$ (i.e., $P_3$) = (5 − 1) * 10/15 ≈ 3
Third iterative loop (i.e., when r = 2):
# of free tokens allocated to $s_2$ (i.e., $P_2$) = (5 − 2) * 10/15 = 2
Fourth iterative loop (i.e., when r = 3):
# of free tokens allocated to $s_3$ (i.e., $P_5$) = (5 − 3) * 10/15 ≈ 1
Fifth iterative loop (i.e., when r = 4):
# of free tokens allocated to $s_4$ (i.e., $P_4$) = (5 − 4) * 10/15 ≈ 1

As shown in Tables 3-4, in one embodiment, the consumer token allocation unit 590 allocates a data party ranked first in the ranked/ordered list with more free tokens than any other data party in the ranked/ordered list. As further shown in Tables 3-4, in one embodiment, the consumer token allocation unit 590 allocates a data party ranked last in the ranked/ordered list with fewer free tokens than any other data party in the ranked/ordered list.

In one embodiment, the machine learning model M needs to train on different data provided by different data parties $P_i$ over time. In one embodiment, in a given epoch (i.e., round) of federated learning, the federated learning training unit 510 is configured to dynamically select one or more data parties to provide data in the given epoch. For example, in one embodiment, the federated learning training unit 510 dynamically selects one or more data parties to provide data in a given epoch based on one or more selections by one or more data parties that consume data in the given epoch. As another example, in one embodiment, the federated learning training unit 510 dynamically selects one or more data parties to provide data in a given epoch based on random selection.

In one embodiment, timing of a selection of a data party to provide data and/or quality of data provided by the data party determines contributions of the data party (i.e., benefits gained from the data party) with respect to training the machine learning model M. For example, as accuracy of the machine learning model M increases faster in the earlier epochs (i.e., rounds) of federated learning, a data party that provides data in the earlier epochs of federated learning contributes to the training the machine learning model M. As another example, as training the machine learning model M based on larger quantities of data improves classification/prediction scores of the machine learning model M, a data party that provides a large quantity of data contributes to the training the machine learning model M. Not all data parties contribute equally to the training of the machine learning model M.

As benefits of training diminishes and/or fewer data parties provide data over time, the system 330 provides incentives to train more or for more data parties to provide data. In one embodiment, the aggregator 400 comprises a token reimbursement unit 600. In one embodiment the token reimbursement unit 600 is configured to determine, for each data party, utility derived from the data party over time. Utility derived from a data party is a qualitative measurement indicative of contributions of the data party with respect to accuracy of the machine learning model M (i.e., benefits gained from the data party). In one embodiment, utility derived from a data party is based on: (1) a number of times the data party is selected (via the federated learning training unit 510) to provide data over time, and (2) how much one or more other data parties benefitted from the data provided by the data party over time. Utility derived from a data party over time represents impact of participation of the data party (i.e., impact of data provided by the data party) on accuracy of the machine learning model M.

In one embodiment, in a given epoch (i.e., round) of federated learning, the token reimbursement unit 600 is configured to reimburse one or more tokens to one or more data parties based on utility derived from the one or more data parties over time. By allocating tokens based on utility derived from data parties over time, the token reimbursement unit 600 ensures that allocation of new tokens to the data parties is fair, that participation/selection of good providers (i.e., data parties that provide data from which other data parties benefit from) is encouraged, and that participation of data parties in earlier epochs of federated learning is encouraged. For example, if a data party provided data in a given epoch and one or more other data parties consumed the data provided, the token reimbursement unit 600 reimburses one or more tokens to the one or more other data parties if benefits from the data provided are few (i.e., less utility derived from the data party).

Let R generally denote a current/given epoch (i.e., round) of federated learning, let $acc_{max}$ generally denote a maximum accuracy of the machine learning model M until the $R^{th}$ epoch of federated learning, and let $acc_R$ generally denote an accuracy of the machine learning model M in the $R^{th}$ epoch of federated learning. In one embodiment, the token reimbursement unit 600 is configured to track the following: (1) the maximum accuracy $acc_{max}$ of the machine learning model M until the $R^{th}$ epoch of federated learning, (2) the accuracy $acc_R$ of the machine learning model M in the $R^{th}$ epoch of federated learning, and (3) one or more data parties $P_i$ providing data in the $R^{th}$ epoch of federated learning.

Let I generally denote an amount of improvement in the accuracy (i.e., utility) ("accuracy improvement") of the machine learning M in a given epoch (i.e., round) of federated learning. In one embodiment, the token reimbursement unit 600 is configured to observe and track improvement of the machine learning model M over time. In one embodiment, the token reimbursement unit 600 is configured to determine the accuracy improvement I of the machine learning M in the $R^{th}$ epoch of federated learning in accordance with equation (1) provided below:

$$I = \max(0.0, (acc_R - acc_{max})/acc_{max}), \qquad (1)$$

wherein the accuracy improvement I is in the range [0.0, 1.0].

In one embodiment, the smaller the accuracy improvement I of the machine learning model M in the $R^{th}$ epoch of federated learning, the bigger the amount of tokens reimbursed, via the token reimbursement unit 600, in the $R^{th}$ epoch of federated learning. The system 330 keeps the data parties engaged over time by reimbursing tokens if the machine learning model M does not improve substantially.

Let $T_{max}$ generally denote a maximum portion of tokens reimbursed (e.g., $T_{max}=0.5$, $T_{max}=0.7$, or $T_{max}=0.25$). Let $I_{max}$ generally denote a maximum amount of improvement in the accuracy of the machine learning model M that leads to using one (1) full token (e.g., $I_{max}=0.8$, $I_{max}=1.0$, or $I_{max}=0.5$). In one embodiment, $I_{max}$ is different for different applications as different applications have different learning curves.

Let $T_R$ generally denote a token reduction ratio in the $R^{th}$ epoch (i.e., round) of federated learning, and let $C_R$ generally denote a total number of tokens used/spent in the $R^{th}$ epoch of federated learning. In one embodiment, the token reimbursement unit 600 is configured to determine an amount tokens_reimbursed$_R$ of tokens to reimburse in the $R^{th}$ epoch of federated learning in accordance with equation (2) provided below:

$$\text{tokens\_reimbursed}_R = C_R * T_R. \qquad (2)$$

In one embodiment, the token reimbursement unit 600 is configured to determine $T_r$ based on a linearly scaled function, wherein $T_r \in [0.0, T_{max}]$, $I \in [0.0, I_{max}]$, and a position of $T_r$ in the range $[0.0, T_{max}]$ is aligned with a position of I in the range $[0.0, I_{max}]$ (i.e., a ratio of $T_r$ to $T_{max}$ is the same as a ratio of I to $I_{max}$).

For example, if $T_{max}=0.5$, $I_{max}=1.0$, $acc_{max}=0.2$, and $acc_R=0.3$, the token reimbursement unit 600 determines I=0.5, in accordance with equation (1) provided above. As I is the midpoint of the range $[0.0, I_{max}=1.0]$, the token reimbursement unit 600 determines $T_r$ is the midpoint of range $[0.0, T_{max}=0.5]$, i.e., $T_r=0.25$. The token reimbursement unit 600 aligns the position of $T_r$ in the range $[0.0, T_{max}=0.5]$ with the position of I in the range $[0.0, I_{max}=1.0]$.

If $C_R$=10, the token reimbursement unit 600 determines tokens_reimbursed$_R$=2, in accordance with equation (2) provided above.

As another example, if $T_{max}$=1.0, $I_{max}$=1.0, acc$_{max}$=0.2, and acc$_R$=0.3, the token reimbursement unit 600 determines I=0.5, in accordance with equation (1) provided above. As I is the midpoint of the range [0.0, $I_{max}$=1.0], the token reimbursement unit 600 determines T$_r$ is the midpoint of range [0.0, $T_{max}$=1.0], i.e., T$_r$=0.5. The token reimbursement unit 600 aligns the position of T$_r$ in the range [0.0, $T_{max}$=1.0] with the position of I in the range [0.0, $I_{max}$=1.0]. If $C_R$=10, the token reimbursement unit 600 determines tokens_reimbursed$_R$=5, in accordance with equation (2) provided above.

As yet another example, if $T_{max}$=1.0, $I_{max}$=0.8, acc$_{max}$=0.2, and acc$_{R_-}$0.3, the token reimbursement unit 600 determines I=0.5, in accordance with equation (1) provided above. As a ratio of I to $I_{max}$ is 0.625, the token reimbursement unit 600 determines T$_r$=0.625. The token reimbursement unit 600 aligns the position of T$_r$ in the range [0.0, $T_{max}$=1.0] with the position of I in the range [0.0, $I_{max}$=0.8]. If $C_R$=10, the token reimbursement unit 600 determines tokens_reimbursed$_R$=6, in accordance with equation (2) provided above.

In one embodiment, the tokenized federated learning system 330 allows parties to benefit from federated datasets by promoting collaborative learning. In one embodiment, the tokenized federated learning system 330 provides an abstraction of data parties into consumer or provider roles depending on their contributions to the training of the machine learning model M. In one embodiment, the tokenized federated learning system 330 monetizes federated learning based on data usage in epochs (i.e., rounds) of federated learning, thereby incentivizing and promoting cross-collaboration among data parties towards the goal of training models without compromising accuracy.

Figure 5:
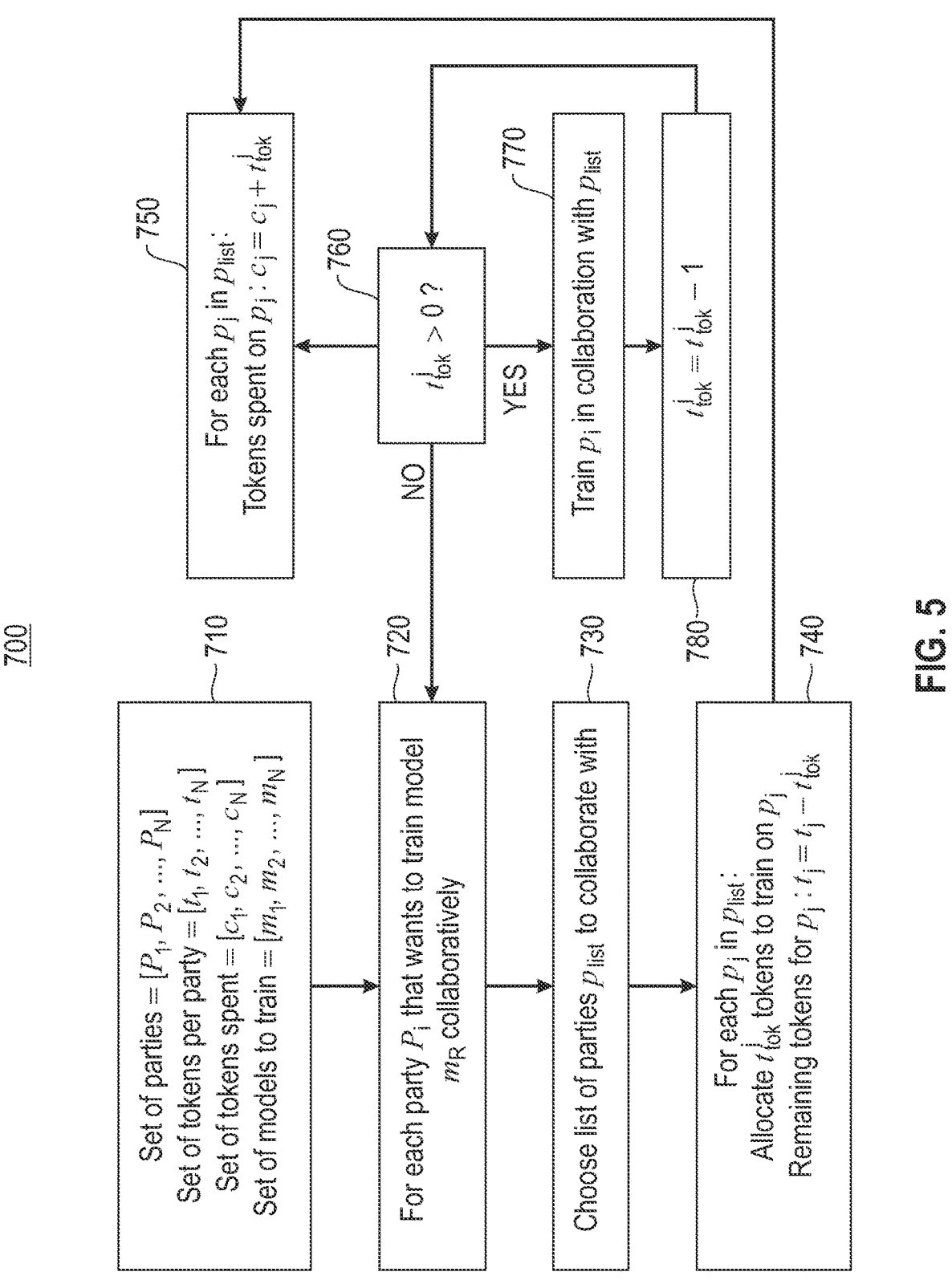
FIG. 5 is a flowchart of an example process implemented by the federated learning training unit in a given epoch of federated learning.

FIG. 5 is a flowchart of an example process 700 implemented by the federated learning training unit 510 in a given epoch (i.e., round) of federated learning, in accordance with an embodiment of the invention. In process block 710, the federated learning training unit 510 maintains the following information: (1) a first set [$P_1$, $P_2$, . . . , $P_N$] of data parties, (2) a second set [$t_1$, $t_2$, . . . , $t_N$] of tokens per data party, (3) a third set [$c_1$, $c_2$, . . . , $c_N$] of tokens spent per data party, and (4) a fourth set [$m_1$, $m_2$, . . . , $m_N$] of local models trained per data party. In process block 720, the federated learning training unit 510 determines each data party $P_i$ of the first set that wants to train a model $m_R$ collaboratively, and initiates a process of selecting one or more other data parties for the data party $P_i$ to collaborate with. In process block 730, the federated learning training unit 510 determines a list $p_{list}$ of one or more other data parties for the data party $P_i$ to collaborate with. In process block 740, for each data party $P_j$ of $p_{list}$, the federated learning training unit 510 allocates $$t_{tok}^j$$

tokens to train on the data party $p_j$, such that the remaining tokens for the data party $$p_j \text{ is } t_i = t_i - t_{tok}^j.$$

In process block 750, for each data party $P_j$ of $p_{list}$, the federated learning training unit 510 determines an amount of tokens used/spent on the data party $$p_j \text{ is } c_j = c_j + t_{tok}^j.$$

In process block 760, the federated learning training unit 510 determines if $$t_{tok}^j > 0.$$

If $$t_{tok}^j > 0,$$

continue to process block 770. In process block 770, the federated learning training unit 510 triggers federated learning, such that the data party $p_i$ trains the model $m_R$ collaboratively with $p_{list}$. If $$t_{tok}^j \leq 0,$$

return to process block 720.

In process block 780, the federated learning training unit 510 deducts one full token from $$t_{tok}^j (\text{i.e., } t_{tok}^j = t_{tok}^j - 1),$$

and returns to process block 760.

FIG. 6 is a flowchart for an example process 800 for incentivizing federated learning across data parties using tokens, in accordance with an embodiment of the invention. In process block 810, train a machine learning model collaboratively by initiating a round of federated learning across a plurality of data parties, where each data party is allocated one or more tokens to utilize during the training. In process block 820, maintain, for each data party, a corresponding data usage profile indicative of an amount of data the data party consumed during the training, resource usage of the data party, and reputation of the data party. In process block 830, maintain, for each data party, a corresponding participation profile indicative of an amount of data the data party provided during the training, resource usage of the data party, and reputation of the data party. In process block 840, selectively allocate new tokens to one or more of the plurality of data parties based on each participation profile maintained. In process block 850, selectively allocate additional new tokens to one or more of the plurality of data parties based on each data usage profile maintained. In process block 860, reimburse one or more tokens utilized during the training to one or more of the plurality of data parties based on one or more measurements of accuracy of the machine learning model.

In one embodiment, process blocks 810-860 are performed by one or more components of the system 330, such as the aggregator 400.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. In one embodiment, this cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants).

Resource pooling: the provider's computing resources are pooled to serve a plurality of consumers using a multi-tenant model, with different physical and virtual resources dynamically assigned and reassigned according to demand. In one embodiment, there is a sense of location independence in that the consumer generally has no control or knowledge over the exact location of the provided resources but is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one embodiment, it is managed by the organization or a third party and exists on-premises or off-premises.

Community cloud: the cloud infrastructure is shared by several organizations and supports a specific community that has shared concerns (e.g., mission, security requirements, policy, and compliance considerations). In one embodiment, it is managed by the organizations or a third party and exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 7:
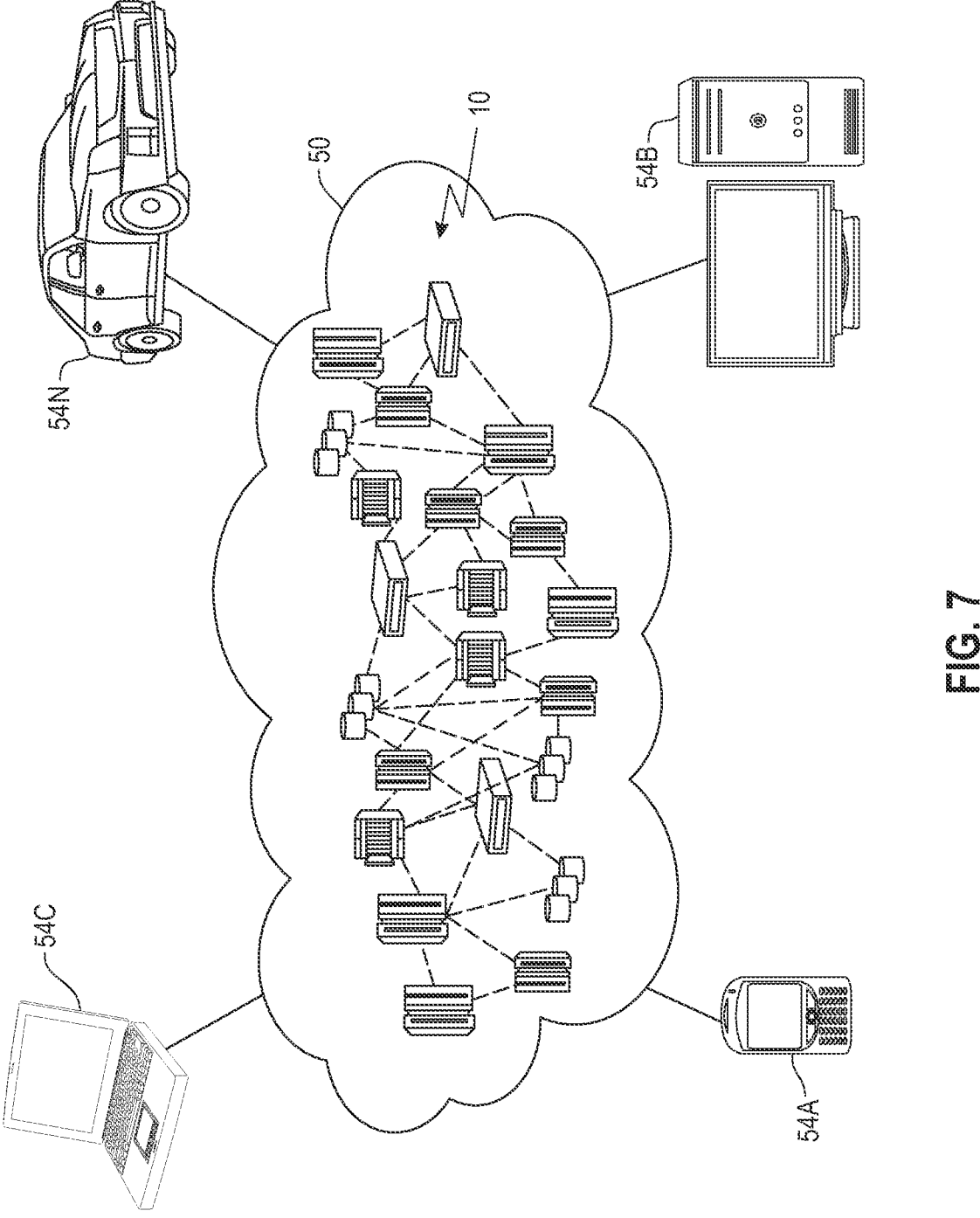
FIG. 7 depicts a cloud computing environment according to an embodiment of the present invention.

FIG. 7 depicts a cloud computing environment 50 according to an embodiment of the present invention. As shown, in one embodiment, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate. In one embodiment, nodes 10 communicate with one another. In one embodiment, they are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 8:
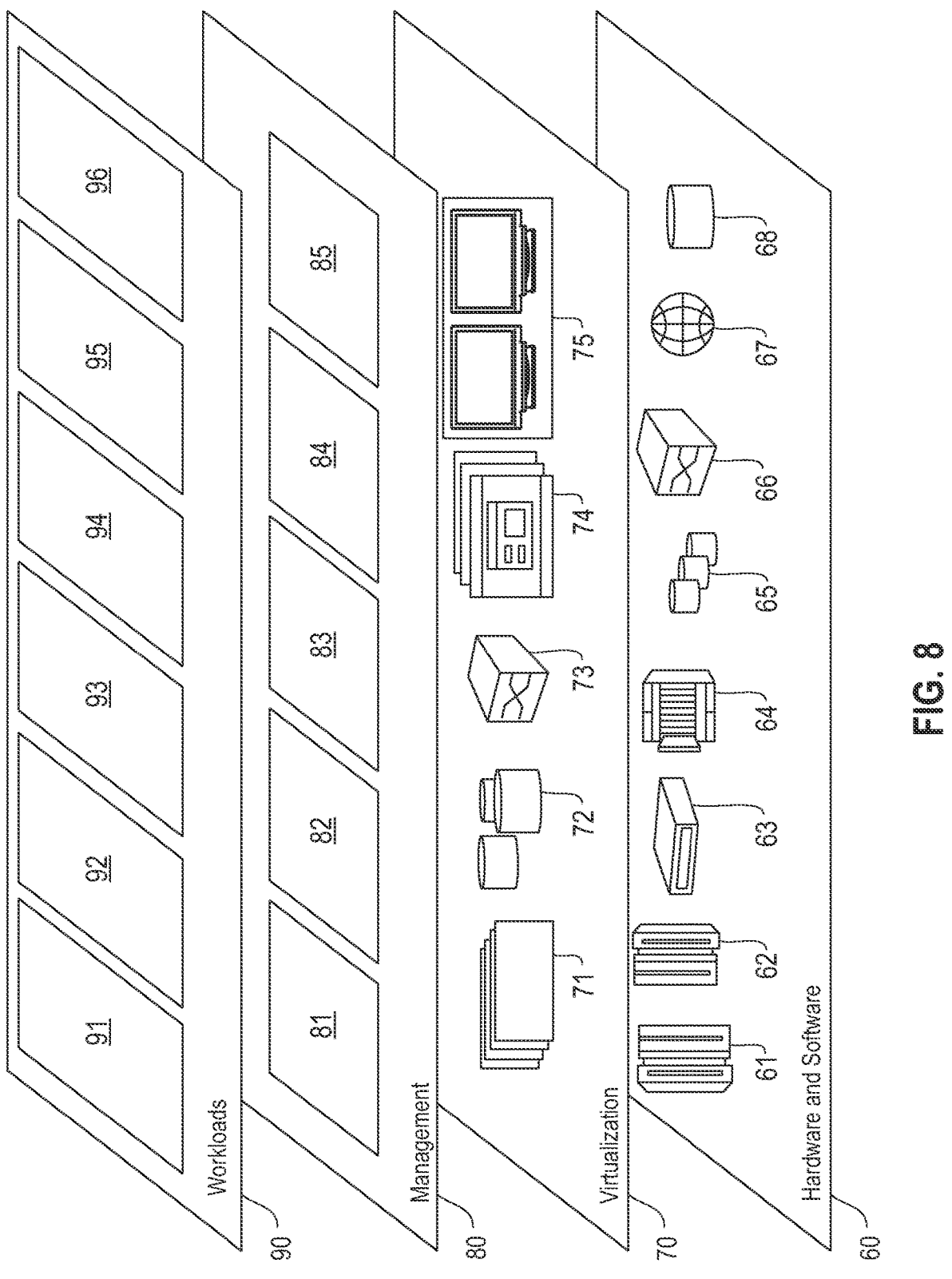
FIG. 8 depicts abstraction model layers according to an embodiment of the present invention.

FIG. 8 depicts a set of functional abstraction layers provided by cloud computing environment 50 according to an embodiment of the present invention. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

In one embodiment, virtualization layer 70 provides an abstraction layer from which the following examples of virtual entities are provided: virtual servers 71; virtual storage 72; virtual networks 73, including virtual private networks; virtual applications and operating systems 74; and virtual clients 75.

In one embodiment, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one embodiment, these resources include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

In one embodiment, workloads layer 90 provides examples of functionality for which the cloud computing environment is utilized. In one embodiment, examples of workloads and functions which are provided from this layer include: mapping and navigation 91; software development and lifecycle management 92; virtual classroom education delivery 93; data analytics processing 94; transaction processing 95; and federated learning 96 (e.g., a tokenized federated learning system 330 (FIG. 2)).

Figure 9:
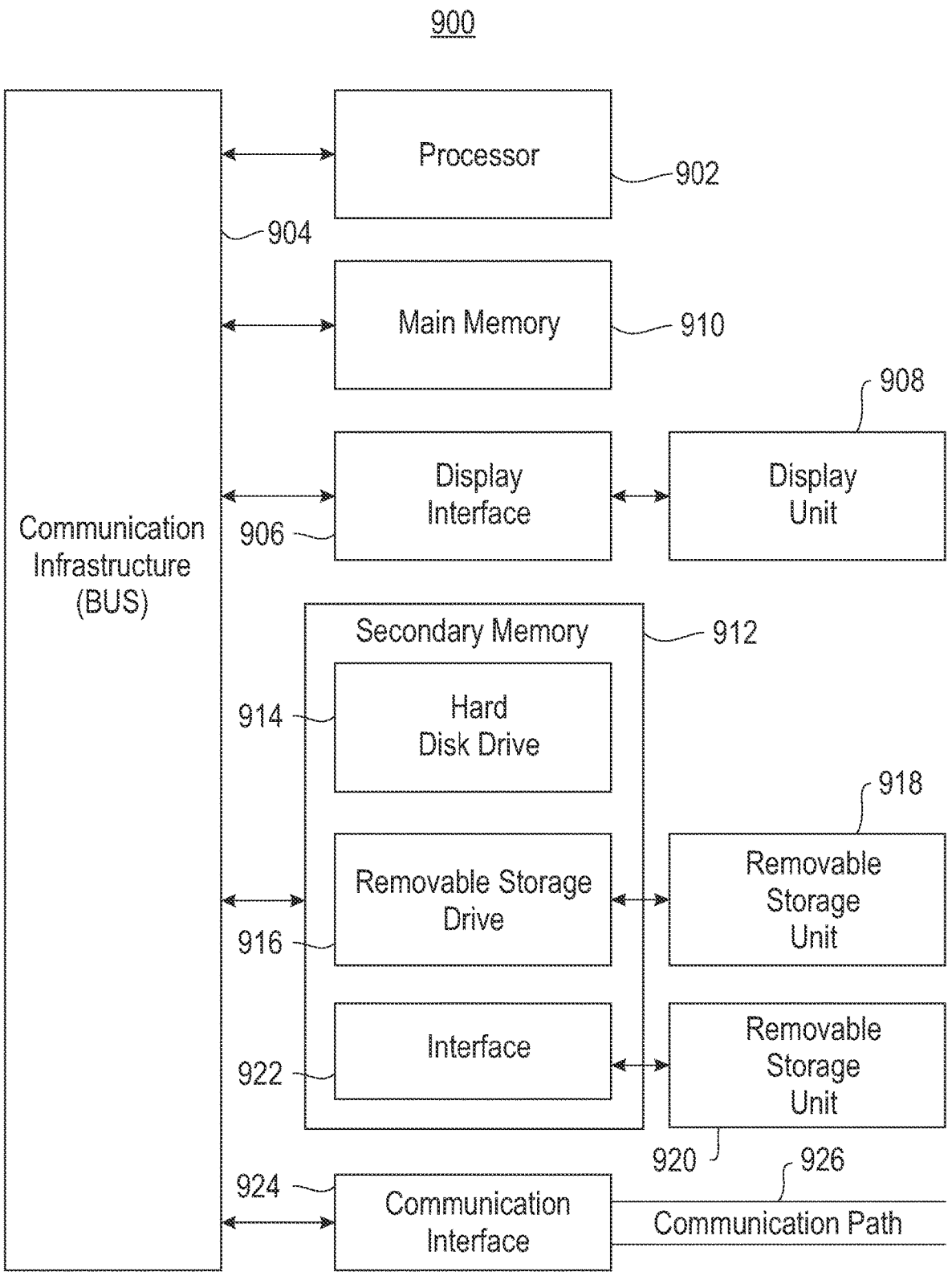
FIG. 9 is a high level block diagram showing an information processing system useful for implementing an embodiment of the invention.

FIG. 9 is a high level block diagram showing an information processing system 900 useful for implementing one embodiment of the invention. The computer system includes one or more processors, such as processor 902. The processor 902 is connected to a communication infrastructure 904 (e.g., a communications bus, cross-over bar, or network).

The computer system can include a display interface 906 that forwards graphics, text, and other data from the voice communication infrastructure 904 (or from a frame buffer not shown) for display on a display unit 908. In one embodiment, the computer system also includes a main memory 910, preferably random access memory (RAM), and also includes a secondary memory 912. In one embodiment, the secondary memory 912 includes, for example, a hard disk drive 914 and/or a removable storage drive 916, representing, for example, a floppy disk drive, a magnetic tape drive, or an optical disk drive. The removable storage drive 916 reads from and/or writes to a removable storage unit 918 in a manner well known to those having ordinary skill in the art. Removable storage unit 918 represents, for example, a floppy disk, a compact disc, a magnetic tape, or an optical disk, etc. which is read by and written to by removable storage drive 916. As will be appreciated, the removable storage unit 918 includes a computer readable medium having stored therein computer software and/or data.

In alternative embodiments, the secondary memory 912 includes other similar means for allowing computer programs or other instructions to be loaded into the computer system. Such means include, for example, a removable storage unit 920 and an interface 922. Examples of such means include a program package and package interface (such as that found in video game devices), a removable memory chip (such as an EPROM, or PROM) and associated socket, and other removable storage units 920 and interfaces 922, which allows software and data to be transferred from the removable storage unit 920 to the computer system.

In one embodiment, the computer system also includes a communication interface 924. Communication interface 924 allows software and data to be transferred between the computer system and external devices. In one embodiment, examples of communication interface 924 include a modem, a network interface (such as an Ethernet card), a communication port, or a PCMCIA slot and card, etc. In one embodiment, software and data transferred via communication interface 924 are in the form of signals which are, for example, electronic, electromagnetic, optical, or other signals capable of being received by communication interface 924. These signals are provided to communication interface 924 via a communication path (i.e., channel) 926. In one embodiment, this communication path 926 carries signals and is implemented using wire or cable, fiber optics, a phone line, a cellular phone link, an RF link, and/or other communication channels.

Embodiments of the invention may be a system, a method, and/or a computer program product at any possible technical detail level of integration. The computer program product may include a computer readable storage medium (or media) having computer readable program instructions thereon for causing a processor to carry out aspects of embodiments of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the invention.

Aspects of embodiments of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that embodiments of the invention provide a system, computer program product, and method for implementing the embodiments of the invention. Embodiments of the invention further provide a non-transitory computer-useable storage medium for implementing the embodiments of the invention. The non-transitory computer-useable storage medium has a computer-readable program, wherein the program upon being processed on a computer causes the computer to implement the steps of embodiments of the invention described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments of the invention only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for federated learning, comprising:

initiating the federated learning across a plurality of data parties, wherein the federated learning comprises a plurality of epochs;

for a given epoch of the plurality of epochs:

ranking one or more provider data parties comprising the data parties based on a plurality of data received during the given epoch, a resource usage of the one or more provider data parties, and a reputation of the one or more provider data parties;

allocating one or more new tokens for use during training to the one or more provider data parties based on the ranking;

training, by a plurality of consumer data parties comprising the data parties, a machine learning model on the plurality of data received during the given epoch from the one or more provider data parties; and reimbursing one or more tokens utilized during the training to the one or more provider data parties based on an accuracy of the machine learning model in the given epoch relative to an accuracy of the machine learning model in an earlier epoch.

2. The method of claim 1, further comprising:

counting, for each of the consumer data parties, a corresponding number of tokens utilized by the consumer data party during the training, wherein the corresponding number of tokens is indicative of an amount of data the consumer data party consumed to train the machine learning model.

3. The method of claim 2, further comprising:

sorting the plurality of consumer data parties into a ranked list based on, for each data party, the corresponding number of tokens utilized by the consumer data party during the training; and allocating the new tokens based on the ranked list, wherein a consumer data party ranked first in the ranked list is allocated a most amount of the new tokens, and a consumer data party ranked last in the ranked list is allocated a fewest amount of the new tokens.

4. The method of claim 1, further comprising:

counting, for each provider data party, a corresponding number of tokens utilized by the provider data party during the training, wherein the corresponding number of tokens is indicative of an amount of data the provider data party provided to train the machine learning model.

5. The method of claim 1, further comprising:

for each epoch of the federated learning:

tracking a first measurement representing a maximum accuracy of the machine learning model until the epoch of the federated learning;

tracking a second measurement representing the accuracy of the machine learning model in the epoch of the federated learning; and determining an improvement in the accuracy of the machine learning model based on the first measurement and the second measurement.

6. The method of claim 5, wherein reimbursing one or more tokens utilized during the training to one or more of the plurality of data parties based on one or more measurements of accuracy of the machine learning model comprises:

determining an amount of tokens utilized during the training to reimburse based on the improvement in the accuracy of the machine learning model.

7. A system for federated learning, comprising:

at least one processor; and a non-transitory computer readable memory device storing instructions that when executed by the at least one processor causes the at least one processor to perform operations including:

initiating the federated learning across a plurality of data parties, wherein the federated learning comprises a plurality of epochs;

for a given epoch of the plurality of epochs:

ranking one or more provider data parties comprising the data parties based on a plurality of data received during the given epoch, a resource usage of the one or more provider data parties, and a reputation of the one or more provider data parties;

allocating one or more new tokens for use during training to the one or more provider data parties based on the ranking;

training, by a plurality of consumer data parties comprising the data parties, a machine learning model on the plurality of data received during the given epoch from the one or more provider data parties; and reimbursing one or more tokens utilized during the training to the one or more provider data parties based on an accuracy of the machine learning model in the given epoch relative to an accuracy of the machine learning model in an earlier epoch.

8. The system of claim 7, wherein the operations further comprise:

counting, for each of the consumer data parties, a corresponding number of tokens utilized by the consumer data party during the training, wherein the corresponding number of tokens is indicative of an amount of data the consumer data party consumed to train the machine learning model.

9. The system of claim 8, further comprising:

sorting the plurality of consumer data parties into a ranked list based on, for each data party, the corresponding number of tokens utilized by the consumer data party during the training; and allocating the new tokens based on the ranked list, wherein a consumer data party ranked first in the ranked list is allocated a most amount of the new tokens, and a consumer data party ranked last in the ranked list is allocated a fewest amount of the new tokens.

10. The system of claim 7, wherein the operations further comprise:

counting, for each provider data party, a corresponding number of tokens utilized by the provider data party during the training, wherein the corresponding number of tokens is indicative of an amount of data the provider data party provided to train the machine learning model.

11. The system of claim 7, wherein the operations further comprise:

for each epoch of the federated learning:

tracking a first measurement representing a maximum accuracy of the machine learning model until the epoch of the federated learning;

tracking a second measurement representing the accuracy of the machine learning model in the epoch of the federated learning; and determining an improvement in the accuracy of the machine learning model based on the first measurement and the second measurement.

12. The system of claim 11, wherein reimbursing the one or more tokens utilized during the training to one or more of the plurality of data parties based on one or more measurements of accuracy of the machine learning model comprises:

determining an amount of tokens utilized during the training to reimburse based on the improvement in the accuracy of the machine learning model.

13. A computer program product for federated learning, the computer program product comprising a computer readable storage medium having program instructions embodied therewith, the program instructions executable by a processor to cause the processor to:

initiate the federated learning across a plurality of data parties, wherein the federated learning comprises a plurality of epochs;

for a given epoch of the plurality of epochs:

rank one or more provider data parties comprising the data parties based on a plurality of data received during the given epoch, a resource usage of the one or more provider data parties, and a reputation of the one or more provider data parties;

allocate one or more new tokens for use during training to the one or more provider data parties based on the ranking;

train, by a plurality of consumer data parties comprising the data parties, a machine learning model on the plurality of data received during the given epoch from the one or more provider data parties; and reimburse one or more tokens utilized during the training to the one or more provider data parties based on an accuracy of the machine learning model in the given epoch relative to an accuracy of the machine learning model in an earlier epoch.

14. The computer program product of claim 13, wherein the program instructions executable by the processor further cause the processor to:

count, for each of the consumer data parties, a corresponding number of tokens utilized by the consumer data party during the training, wherein the corresponding number of tokens is indicative of an amount of data the consumer data party consumed to train the machine learning model.

15. The computer program product of claim 14, further comprising:

sorting the plurality of consumer data parties into a ranked list based on, for each data party, the corresponding number of tokens utilized by the consumer data party during the training; and allocating the new tokens based on the ranked list, wherein a consumer data party ranked first in the ranked list is allocated a most amount of the new tokens, and a consumer data party ranked last in the ranked list is allocated a fewest amount of the new tokens.

16. The computer program product of claim 13, wherein the program instructions executable by the processor further cause the processor to:

count, for each provider data party, a corresponding number of tokens utilized by the provider data party during the training, wherein the corresponding number of tokens is indicative of an amount of data the provider data party provided to train the machine learning model.

17. The computer program product of claim 13, wherein the program instructions executable by the processor further cause the processor to:

for each epoch of the federated learning:

track a first measurement representing a maximum accuracy of the machine learning model until the epoch of the federated learning;

track a second measurement representing the accuracy of the machine learning model in the epoch of the federated learning;

determine an improvement in the accuracy of the machine learning model based on the first measurement and the second measurement; and determine an amount of tokens utilized during the training to reimburse based on the improvement in the accuracy of the machine learning model.

* * * * *